United States Patent Office 3,215,503
Patented Nov. 2, 1965

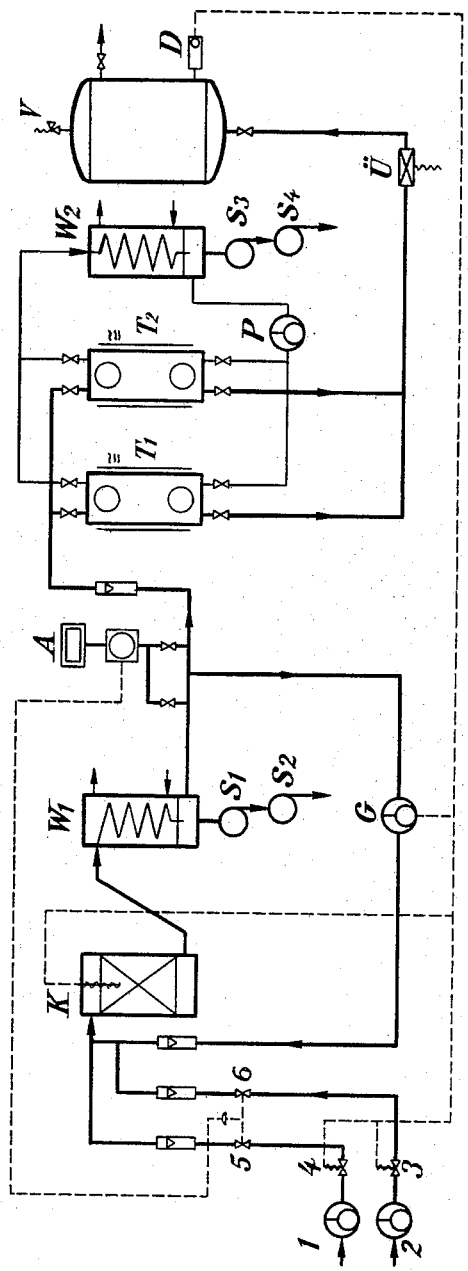

3,215,503
APPARATUS FOR GENERATING AND STORING INERT GAS
Friedrich Nessler, Wiesbaden, Germany, assignor to Hans J. Zimmer Verfahrenstechnik, Frankfurt am Main, Germany
Filed Oct. 9, 1961, Ser. No. 143,931
1 Claim. (Cl. 23—281)

This invention relates in general to a process for the production of inert gas from air and more particularly to an arrangement for preventing the diffusion of oxygen into a generated inert gas mixture produced by the process described in application Serial No. 143,930, filed Oct. 9, 1961, of which the present application is an improvement.

The process described in the mentioned application covers the continuous generation of an inert gas mixture comprising nitrogen and noble gases, which may possibly contain a portion of hydrogen. It is carried out by adding air to an oxygen-freed product gas mixture which is being circulated over a catalyst at a volumetric proportion of less than 1 part of air to 10 parts of circulated gas, preferably at a proportion of 1:11 up to 1:50 or more. After addition of the required amount of hydrogen gas to convert the oxygen in the air to water, the gas and air mixture is passed over a highly active catalyst at temperatures below 300° C., and the main amount of the catalyst-treated gas is circulated through a cooler with a water separator. A portion of the generated amount of inert gas is periodically or continuously separated from the circulation and the remainder is recycled to mix with the incoming air. By this process gas mixtures of very high purity are obtained, for instance with less than 0.1 part per million residual oxygen content.

When automating the process for the application of the inert gas to a desired end use or operation it was found that the obtained high purity in respect to the removal of oxygen was lost, when the gas was subsequently compressed to bring it up to a desired operational pressure. The reason was found to be a diffusion of air through the sealings of the compression apparatus into the highly purified gas mixture. It was surprising to find air leakage into the compressor but heretofore the observation had not been made because gases of such high purity with respect to oxygen removal were not known.

Therefore, to overcome this trouble, the present invention proposes to improve the process described in the aforementioned application by carrying the process out under a pressure, which is higher than the desired operational pressure for the product gas and at temperatures below 300° C. According to the practical requirements pressures of any practical minimum or maximum limit can be applied in removing the oxygen; however, it is higher than the required operational pressure or pressure at which the inert gas is subsequently retained.

Another difficulty occurred in automatic operation because of the variation in quantity of the continuously generated inert product gas being removed. This necessitates a corresponding change in the metering of hydrogen. The hydrogen to air ratio is also regulated in the automatic equipment through a special analytical apparatus which continuously senses the residual oxygen content in the generated mixture of nitrogen and noble gas and operates control valves in the feed lines depending on the analytical values. When producing a mixture of nitrogen and noble gas with a certain content of hydrogen, the hydrogen excess can be measured with the same measuring instrument and the feed mixture regulation be made a function of that.

It was also discovered that a reliable and exact automatic feed gas mixture control is only possible within certain limits of the standard capacity fixed for the particular plant. This requires a highly regular removal of the generated inert gas. In practice such conditions are rarely found. Thus, for instance, for flushing or filling the apparatus, amounts are required, which considerably exceed the average, whereas at another time the necessary quantity is much lower. Such differing removals entail variations of the gas pressure in the whole system and cause the gas mixture controls to fluctuate. Though the controls follow these variations, it has been found that for the generation of gases with extremely low oxygen content, these fluctuations are undesirable and should be avoided.

To overcome this trouble and to regularly generate gases with consistently low oxygen content without or with a desired excess of hydrogen, according to the invention the pressure in the system is kept constant by suitable means, for instance by installing a pressure regulating valve in the outlet line of the product gases, and the inert gases are expanded through the valve into one or several storage tanks, in which they can be stored under a pressure below the pressure prevailing in the generation system. From the storage tanks the gas can be discharged under the desired operational pressure.

To automatically control the process for the generation of inert gas, according to the invention a conventional pressure responsive controller is connected to the storage tank or tanks. This controller, which may be operated either electrically or pneumatically, for example, operates valves for both air inlet and hydrogen, which are installed in the pressure lines, when the adjustable maximum or minimum pressures in the storage tank are reached. In this manner the valves in the pressure lines for air and hydrogen are opened when the minimum pressure is obtained and the plant starts working at the average capacity for which it has been set. The pressure regulating or overflow valve maintains the required working pressure of, for instance, several atmospheres inside the entire generation system, so that constant and regular conditions are prevailing, especially for the feed gas mixture control. The generated amount of inert gas leaves the system, passing through the pressure regulating valve, and fills up the storage tank or tanks. When the maximum pressure is attained in the tank, depending on the setting of the pressure control (which has to be below that pressure at which the pressure regulating valve has been set) the pressure control closes the valves in the air and hydrogen lines. In a similar manner the gas circulation pump and, if required, the preheating of the catalyst furnace can be controlled and both can be switched in prior to or when opening the valves, and/or switched off when closing them.

Furthermore, the conventional method for separating condensate by means of float-operated valves, as is for instance that used in condensation tanks, is inadequate for the generation of gases with extremely low oxygen content, because of the diffusion of air and its included oxygen into the system while discharging water. This trouble was found to be overcome by switching in series two of such float-operated valves as a lock so that the opening periods do not coincide.

The described process and the equipment for its execution generally are suitable for the generation of inert gases from any kind of gas mixture in which the oxygen is reduced to extremely low figures. Thus, in the same way noble gases, for instance argon, can be freed from the oxygen residues. Moreover, it is possible to free technical nitrogen or other gases from residual oxygen. Another possibility is the extraction from gases already containing hydrogen of the residual oxygen content to extremely low figures without the addition of hydrogen. Such gases or gas mixtures for instance include hydrogen generated during electrolysis or from a splitting reaction or other production process, or mixtures of hydrogen and nitrogen required for syntheses, etc. The inert gas recycling is not required if the gases contain only small traces of oxygen, as for instance 0.5% by volume and less.

The attached drawing is a flow sheet illustrating the process. By means of blower 1 compressed air at a predetermined pressure is supplied to the circulating equipment through valves 4 and 5. Blower 2 feeds the hydrogen, also being under the required pressure to the circulating equipment through the valves 3 and 6. The valves 3 and/or 4 are pneumatically or magnetically operated by the pressure controller D, communicating with the storage tank V, in dependence on the adjustable minimum or maximum pressures. The valves 5 and 6 control the flow of air and hydrogen gas respectively in response to pneumatically or electrically received impulses from an analyzer A. The gas circulation pump G recycles a portion of the inert product gas to the catalytic furnace K. The inert gas, hydrogen and air pass through furnace K and cooler W, in which water is removed through valves $S_1$ and $S_2$ in series.

The analyzer A is connected to the product gas line from which the oxygen-free gas mixture is withdrawn and analyzed. The analyzer electrically or pneumatically controls the feed gas mixture in the system by controlling valves 5 and 6.

For drying the generated gas mixture, in a known way, two drying tanks $T_1$ and $T_2$ are provided, which are charged with drying agents and operated alternately. While one drying tank is in operation, the drying agent of the second one is regenerated. This regeneration can be made according to known methods by heat and gas circulation using a pump P, or by a suction procedure in connection with a cooling and water separation in the gas cooler $W_2$, in which case the pump P is designed as vacuum pump.

The self-acting discharge of the condensate, produced on the regeneration of the drying agent, is also effected by two automatically operating condensate outlet systems $S_3$ and $S_4$, being connected in series, to avoid diffusion of air oxygen.

The desired operational pressure is maintained by the pressure regulating or overflow valve U. Only the generated amount of inert gas passes valve U, and this inert gas expands into one or several storage tanks V, where it is stored. To the line downstream of the pressure regulating valve U, or to the storage tank or tanks V a pressure controller D is connected, which can be set to a desired maximum and minimum pressure. The maximum pressure must be adjusted below that at which the pressure regulating valve U is set, whereas the minimum pressure can optionally be adjusted, but preferably should be set above the operational pressure by which the inert gases are led to their point of application.

I claim:

Apparatus for generating inert substantially oxygen-free gas which comprises a catalytic furnace for removing oxygen from oxygen-containing gas by reaction with hydrogen, a storage vessel communicating with said furnace for storing generated product gas under a desired pressure, a pressure regulating valve between said furnace and said storage vessel to maintain a predetermined substantially-constant pressure within said furnace above that desired pressure prevailing in said storage vessel and to release inert gas to said storage vessel only when said predetermined pressure is exceeded, means including valves for feeding air and hydrogen to said furnace, control means communicating with said storage vessel for operating said feed valves in response to pressure fluctuations below and above said desired pressure within said storage vessel, means in said furnace for heating catalyst, means for recycling gas through said furnace, pressure responsive means for regulating flow of said recycled gas and for operating said heating means in response to pressure changes in said storage vessel, cooler means communicating with said furnace for removing condensate from product gas, a discharge line from said cooler having a plurality of float-operated valves in series which operate alternately to prevent entry of air into the cooler through said discharge line.

References Cited by the Examiner

UNITED STATES PATENTS

| | | | |
|---|---|---|---|
| 1,588,258 | 6/26 | Metzger | 23—220 |
| 2,051,125 | 8/36 | Bacon | 252—372 |
| 2,085,584 | 6/37 | Haskell | 23—281 |
| 2,418,162 | 4/47 | Cecil et al. | 23—220 XR |
| 2,897,158 | 7/59 | Sanzenbacher et al. | 252—372 |
| 3,000,707 | 9/61 | Barstow | 23—220 XR |

MORRIS O. WOLK, *Primary Examiner.*

MICHAEL A. BRINDISI, JAMES H. TAYMAN, JR.,
*Examiners.*